United States Patent
Winsky

(10) Patent No.: US 9,851,747 B2
(45) Date of Patent: Dec. 26, 2017

(54) ELECTRONIC BOOK READER WITH CLOSELY JUXTAPOSED DISPLAY SCREENS

(76) Inventor: Peter G. Winsky, Medford, NJ (US)

(*) Notice: Subject to any disclaimer, the term of this patent is extended or adjusted under 35 U.S.C. 154(b) by 467 days.

(21) Appl. No.: 12/784,734

(22) Filed: May 21, 2010

(65) Prior Publication Data

US 2011/0289444 A1    Nov. 24, 2011

(51) Int. Cl.
*G06F 1/16* (2006.01)
*H04N 5/64* (2006.01)

(52) U.S. Cl.
CPC ............. *G06F 1/1616* (2013.01); *H04N 5/64* (2013.01)

(58) Field of Classification Search
USPC ........ 345/173, 901; 715/200, 273, 277, 764, 715/776
See application file for complete search history.

(56) References Cited

U.S. PATENT DOCUMENTS

| | | | | |
|---|---|---|---|---|
| 5,467,102 A * | 11/1995 | Kuno et al. | | 345/1.3 |
| 5,519,827 A * | 5/1996 | Mizushima | | 715/807 |
| 5,774,109 A * | 6/1998 | Winksy et al. | | 345/685 |
| 5,801,713 A * | 9/1998 | Endo et al. | | 345/473 |
| 5,898,430 A * | 4/1999 | Matsuzawa et al. | | 715/204 |
| 6,107,988 A * | 8/2000 | Phillipps | | 345/156 |
| 6,313,828 B1 * | 11/2001 | Chombo | | 345/169 |
| 6,940,497 B2 * | 9/2005 | Vincent et al. | | 345/204 |
| 7,106,296 B1 * | 9/2006 | Jacobson | | 345/107 |
| 7,342,569 B2 * | 3/2008 | Liang et al. | | 345/156 |
| 7,548,220 B2 * | 6/2009 | Silverbrook | | 345/1.3 |
| 7,705,799 B2 * | 4/2010 | Niwa | | 345/1.1 |
| 7,929,885 B2 * | 4/2011 | Sakuma | | 399/258 |
| 2004/0003398 A1* | 1/2004 | Donian et al. | | 725/34 |
| 2005/0184975 A1* | 8/2005 | Sawada | | 345/204 |
| 2006/0019223 A1* | 1/2006 | Wood et al. | | 434/156 |
| 2008/0034282 A1* | 2/2008 | Zernik | | 715/229 |
| 2009/0147310 A1* | 6/2009 | Tsunekawa | | 358/1.15 |
| 2011/0289444 A1* | 11/2011 | Winsky | | 715/776 |

* cited by examiner

*Primary Examiner* — David Choi

(57) ABSTRACT

A portable electronic book reading machine has two display screens juxtaposed in close proximity to allow for automatic cross referencing between primary textual material displayed on the leftmost display screen and related secondary textual material displayed on the rightmost display screen. The machine has memory in which both primary text and secondary text are stored. As the user of the machine changes the page of primary text displayed on the leftmost screen display, ebook controller circuitry automatically refreshes the rightmost screen display to allow the user to cross reference between the primary textual material and the secondary textual material, or at his or her discretion to change the page of secondary textual material displayed, thereby fine tuning the juxtaposition of pages for study.

11 Claims, 3 Drawing Sheets

ELECTRONIC BOOK READER WITH CLOSELY JUXTAPOSED DISPLAY SCREENS

FIELD OF INVENTION

This invention relates to a portable electronic device that allows the user simultaneous access to related electronic textual materials. More particularly, the invention relates to a device for use by scholars, students, teachers, and academicians that allows for easy cross referencing between the same text in different languages or between a primary text and related materials, such as annotations to said primary text.

DESCRIPTION OF RELATED ART

Portable electronic devices are known for accessing information stored in digitally encoded form. For example, U.S. Pat. No. 5,774,109 discloses a hand held electronic book, commonly now known as an "ebook," built on a platform having a keyboard and a single display for displaying text. Similarly, ebooks having a plurality of display screens are known in the art, such as U.S. Pat. No. 6,107,988, U.S. Pat. No. 7,106,296, and U.S. Pat. No. 7,548,220, in that last of which is disclosed technology for joining two screens are together by a cylindrical spine for folding the screens together and "closing" the ebook. While the aforesaid '109 Patent discloses automatic scrolling of textual information on an ebook display screen, other more advanced systems for the navigation of content contained in electronic format in an ebook system are also known in the art, such as, U.S. Pat. No. 7,342,569 that discloses a system for "flipping pages" in an ebook, and U.S. Pat. No. 6,940,497 that teaches a method for sequencing pages on a single ebook display.

SUMMARY OF THE INVENTION

The present invention seeks to solve the problem of cross referencing texts faced by scholars since the invention of the printing press by providing a portable electronic device suitable for use by scholars, students, teachers, and academicians that allows for ease in the cross referencing of textual materials that relate to one another, especially texts that may be written in different languages such that one text is a translation of the other text into a different language.

For example, a native English speaker, having some level of familiarity with the Russian language, who is studying The Brothers Karamazov desires to compare the English translation of the novel with Dostoyevsky's original text. In this example, the primary text, as that term is used in this specification, might be the English translation of the novel, and the secondary text, the original as written in the Russian language; however, the notions of which text is primary and which secondary may well be reversed. Additionally, the secondary text might be an English language annotation of English language primary text.

Pursuant to the preferred embodiment of the present invention, two display screens are juxtaposed in close proximity to allow for automatic cross referencing between the textual material displayed on the leftmost screen (the primary text) and the related textual material, be it a translation of the primary text in another language or an annotation of the primary text in the same language, on the rightmost screen (the secondary text). Additionally, the two screens may at the user's discretion provide for side by side display of pages from any text accessed by the device.

DETAILED DESCRIPTION OF THE INVENTION

Figure 1:
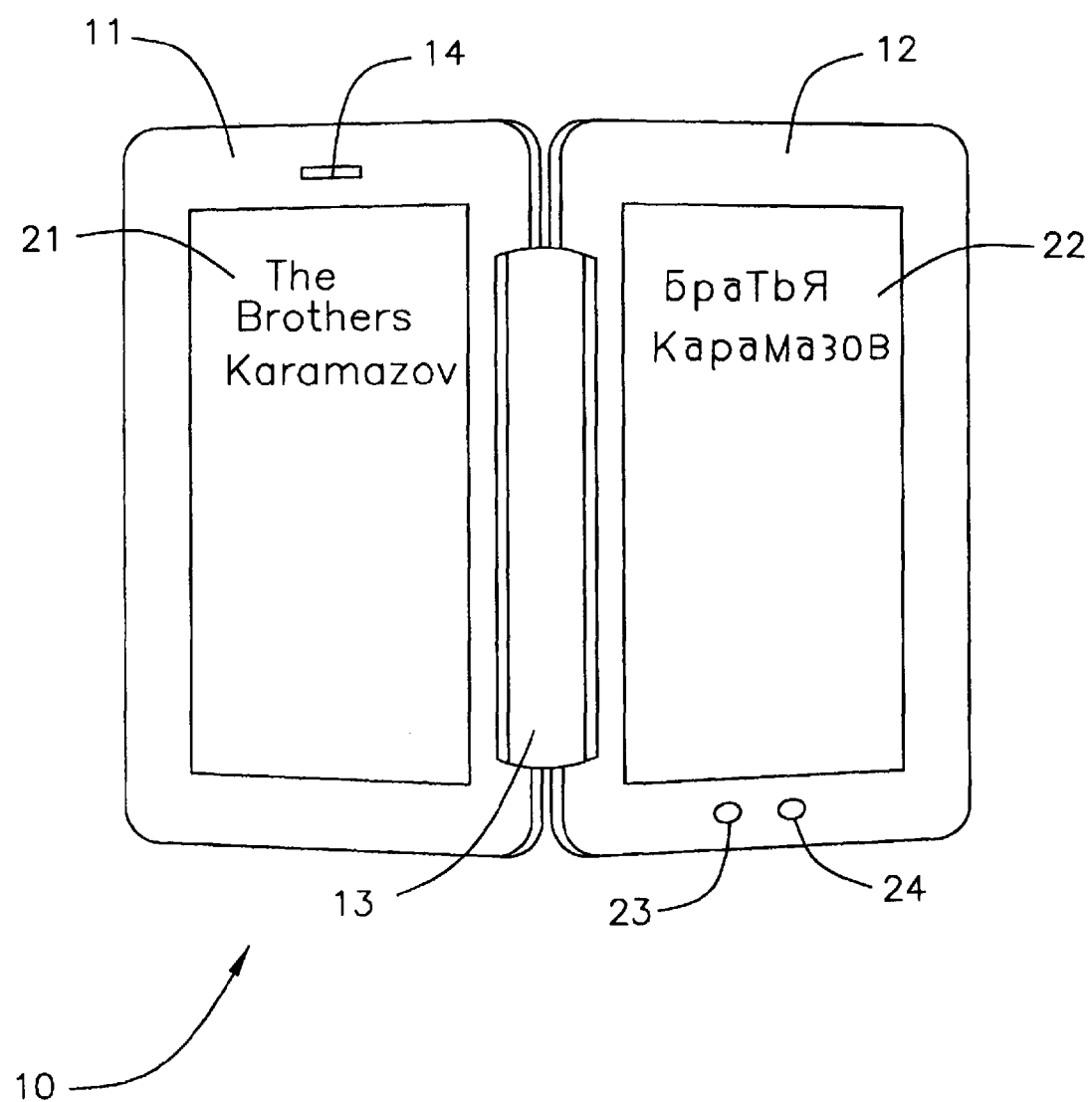
FIG. 1 is a plan view of the platform with side by side display screens.

As shown in FIG. 1, an electronic book device 10 according to the present invention includes a first housing 11 and a second housing 12 mechanically and electrically connected by and through connecting member 13. Not shown in FIG. 1 is an on board electrical power supply 100 (contained in said first housing) such power supply being in the preferred embodiment a rechargeable battery that may be charged through a DC input or a USB connector in said first housing 11 (not pictured).

Mounted in said first housing 11 is primary display screen 21, being a touch screen display as known in the industry. Mounted in said second housing 12 is secondary display screen 22, not a touch screen display. First housing 11 is outfitted with on/off power control 14. Navigation page ahead and page back controls for the display of primary text on primary display screen 21 are implemented in software by way of user manipulation of the primary touch screen display, obviating the need for mechanical navigation controls on housing 11. Under the control of that software, the user may choose to page ahead or page back by more than one page at a time on primary display 21. Mechanical navigation controls are provided in housing 12 for secondary screen display 22, such controls being secondary page back navigation control 23 and secondary page ahead navigation control 24 as shown in FIG. 1, which controls do not provide for paging ahead or back by more than one page at a time. Alternatively, navigation controls for the secondary display screen can be of the same nature as those used for the primary display screen, that is, implemented in software for use with a touch screen display.

Figure 2:
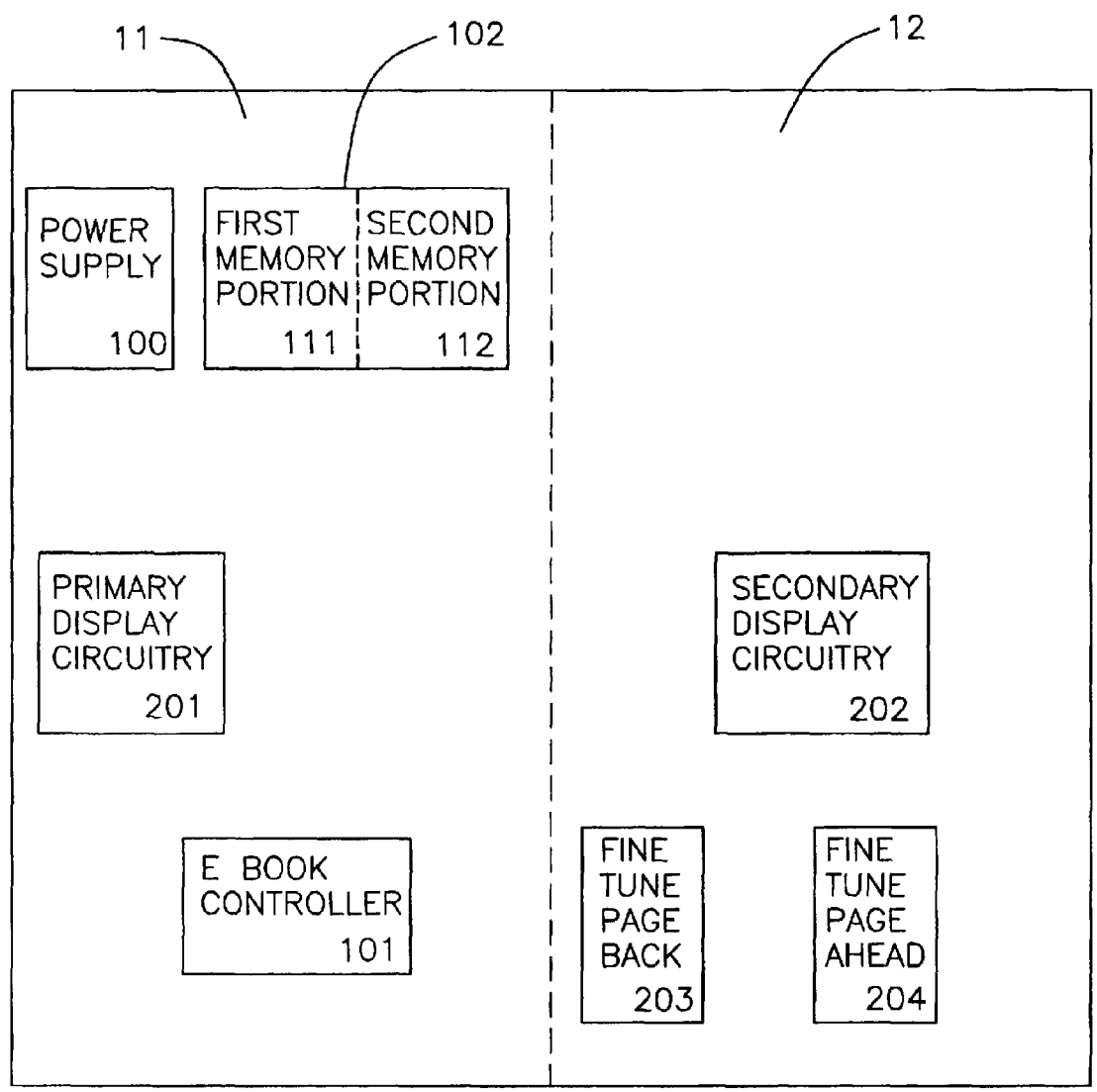
FIG. 2 is a block diagram showing programmed functional elements of a portable electronic device in accordance with the present invention.

FIG. 2 shows the relationship among the electronic components in the present invention. Electrical power supply 100 contained within housing 11 is in the preferred embodiment a rechargeable battery with a power input being a standard USB line. Power supply 100 provides electrical energy to primary display screen 21 though primary display circuitry 201 contained in housing 11 and to secondary screen display 22 through secondary display circuitry 202 contained in housing 12.

Also contained in housing 11 is ebook controller 101 powered by power supply 100 and connected to primary display circuitry 201 and secondary display circuitry 202. Database 102, contained in housing 11 is connected to ebook controller 101 and has at least two memory portions, a first memory portion 111 in which is stored a primary electronic text and a second memory portion 112 in which is stored a secondary electronic text. As is well known in the art, one method of loading such first and second memory portions in accordance with the present embodiment is by accessing an internet source of ebook content through a USB connector, but other methods, such as pre-storing certain texts in said memory portions, may also be utilized. Pagination information stored in the primary text and pagination information stored in the secondary text are correlated and/or coupled to each other. Primary display circuitry 201 and secondary display circuitry 202 are connected to said first memory portion and said second memory portion, respectively. Software for paging ahead and back on the primary display is implemented by ebook controller 101. Secondary page ahead navigation control 24 is connected to fine tune page ahead circuit 204 and secondary page back navigation control 23 is connected to fine tune page back circuit 203, both located in housing 12 and electrically connected to ebook controller 103 through structure 13.

As is known in the industry, primary electronic text and the secondary electronic text contain pagination information to allow such text to be displayed properly, such as on primary screen display 21 and secondary screen display 22, respectively. On power up and using such pagination information, the first page of primary text is automatically displayed on the primary screen display 21 by ebook controller 101 and the first page of secondary text is similarly automatically displayed on secondary screen display 22 by ebook controller 101 by accessing the respective memory portions of memory module 102 and by coordination with primary display circuitry 201 and secondary display circuitry 202. Having accomplished the display of the first pages of primary text and secondary text in close juxtaposition, the software implementation of page turning means contained within the ebook controller 103 of present invention provides for automatic refreshing of the display of secondary text on the secondary screen display 22 in coordination with changes made by the user to the page of primary text displayed on primary screen display 21 by using the pagination information contained in each of memory portions to page ahead or page back the secondary text. Once the secondary display screen 22 has been refreshed, the user can then compare the primary text displayed on primary screen display 21 to the refreshed secondary text and provide feedback at his or her discretion by fine tuning the automatic refreshment using either page back navigation control 23 or page ahead navigation control 24 to change the page of secondary text displayed on secondary display screen 22. Alternatively, automatic refreshing of the secondary text may be overridden by a user actuated display state control which can be used to decouple changes in the primary page displayed from the secondary text displayed.

Figure 3:
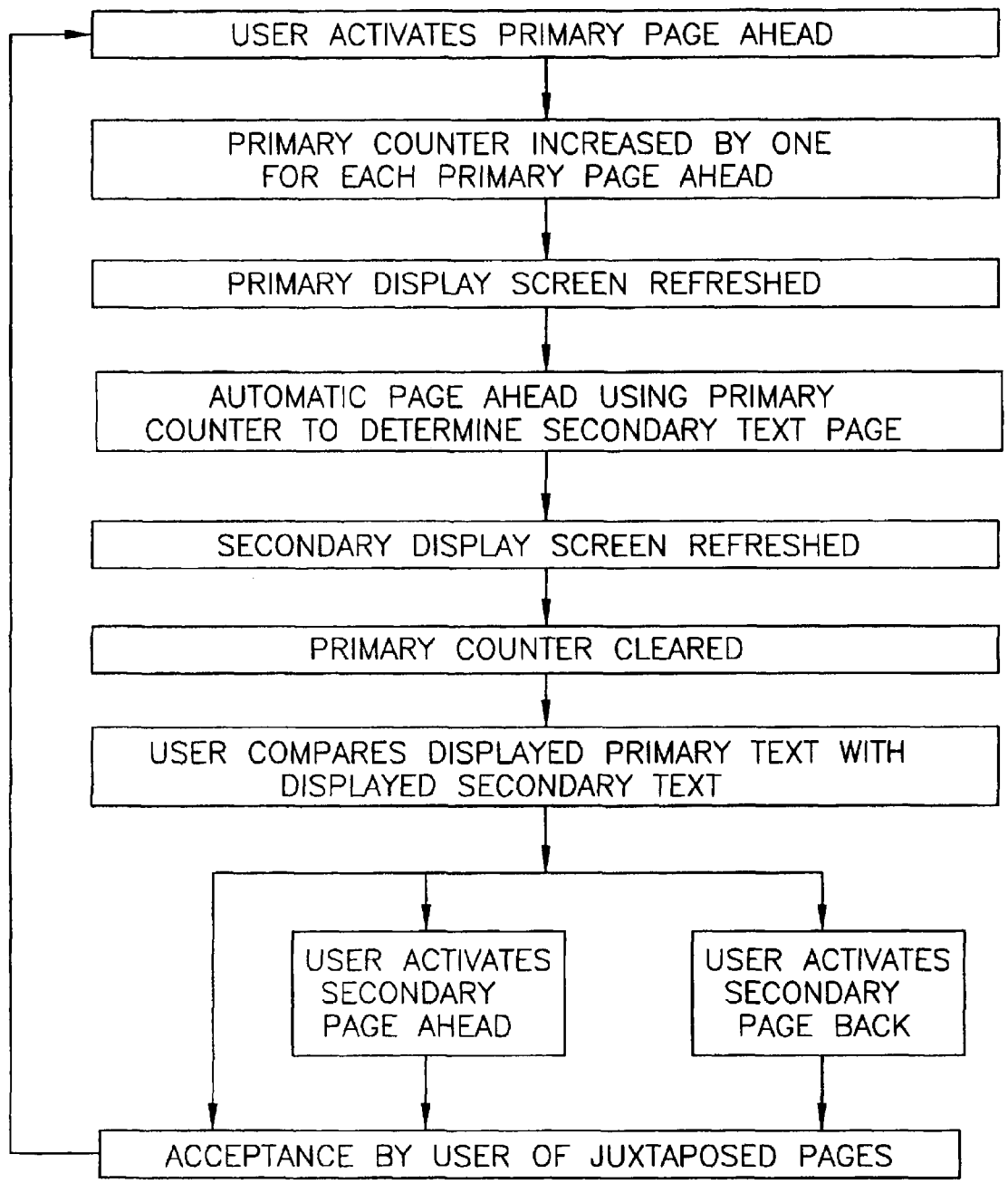
FIG. 3 is a flow chart describing the operation of automatic refreshing of the secondary screen on changes in page shown on the primary screen, and subsequent fine tuning feedback from the user.

FIG. 3 is a flow chart in the case of a page ahead by the user with respect to primary text for the operation of automatic page refreshing means as contained in ebook controller 101 and fine tuning of the page of secondary text displayed by user. When the user pages ahead in the primary text, ebook controller means automatically refreshes the secondary display screen to display another page of secondary text by comparing and using said pagination information from each memory portion so that the same number of pages ahead are used to refresh the secondary display. In the preferred embodiment, such comparison and use is done by way of a counter contained in ebook controller 101 for the number of pages ahead chosen by the user for the primary text. Once the secondary display screen has been thusly refreshed, the operator after reviewing the juxtaposed pages can, if necessary, fine tune the secondary display by use of the secondary page back navigation control 23 or secondary page ahead navigation control 24. For example, after paging ahead several pages in the English text of The Brothers Karamazov on the primary display screen, the user, on reviewing the newly automatically refreshed page of the Russian text on the secondary display screen, may want to fine tune the Russian text to be displayed using the mechanical navigation controls provided in housing 12. As can be appreciated, similar steps to those set forth in FIG. 3 would be applicable in the case of a page back by the user in the primary text.

The primary text and secondary text may be displayed side by side on a single display screen, as can be appreciated by one skilled in the art. Further, automatic refreshment of a screen display can also be implemented in software in the opposite manner, that is, that a change in the page of secondary text displayed can cause an automatic refreshment of the page of primary text displayed.

Although my invention has been described in terms of the preferred embodiment, one of ordinary skill in the art can make additional embodiments or modifications to my preferred art in light of this teaching without departing from the spirit or exceeding the scope of the claimed invention. Accordingly, it is to be understood that the drawings and descriptions herein are given by way of example only to facilitate comprehension of my invention and should not be construed to limit the scope of that invention or my claims relative thereto.

I claim:

1. A portable electronic device for reading and studying pre-paginated electronic textual materials resident on the Internet comprising:
a first housing containing an electrical power supply;
a second housing juxtaposed in a side by side manner with said first housing and electrically coupled to said first housing;
said first housing containing a first display screen;
said second housing containing a second display screen;
a primary electronic text in a first language having pagination information embedded therein for display page by page on said one of said display screens;
a secondary electronic text being a translation of said primary electronic text into a second language having pagination information embedded therein for display page by page on the other of said display screens;
user actuated primary page turning controls coupled to said first housing containing the display screen on which is displayed the primary text;
a primary page change counter that tracks a delta value equal to the number of page changes and that is automatically increased by one count for each primary page moved ahead by the user or is automatically decreased by one count for each primary page moved back by the user;
user actuated secondary page turning controls coupled to the other of said housings;
automatic secondary page turning means responsive to the primary page change counter by which the page of secondary electronic text displayed is refreshed by moving the secondary page ahead or back by the number of pages equal to the number stored in said primary page change counter to reflect the page of primary electronic text chosen to be displayed by the user wherein said user actuated secondary page turning controls allow the user to compare the displayed page of primary text to the page of secondary text displayed on said display screen after it is so refreshed, and, if deemed necessary by the user, to activate secondary page ahead means or secondary page back means in order to juxtapose the correct secondary page with the primary page in accordance with the translation of the primary text into said second language, and said primary counter is automatically reset to zero.

2. The portable electronic device of claim 1 in which said first housing is mechanically coupled to said second housing.

3. The portable electronic device of claim 2 wherein said mechanical coupling between said first housing and said second housing is a hinge mechanism whereby said primary and secondary display screens can be folded together in a face to face manner.

4. The portable electronic device of claim 1 in which said display screen on which is displayed the primary text is a touch screen display.

5. The portable electronic device of claim 1 in which said automatic secondary page turning means further includes a user actuated state control by which the user can override the operation of the secondary automatic page turning means.

6. A portable electronic device for reading and studying pre-paginated electronic textual materials resident on the Internet comprising:
- a housing containing an electrical power supply;
- said housing containing a display screen;
- said display screen being capable of being split into a primary display screen and a secondary display screen;
- a primary electronic text in a first language having pagination information embedded therein for display page by page on said primary display screen;
- a secondary electronic text being a translation of said primary electronic text into a second language having pagination information embedded therein for display page by page on said secondary display screen;
- a primary page change counter that tracks a delta value equal to the number of page changes and that is automatically increased by one count for each primary page moved ahead by the user or is automatically decreased by one count for each primary page moved back by the user;
- user actuated primary page turning controls coupled to said primary display screen;
- user actuated secondary page turning controls coupled to said secondary display screen;
- automatic secondary page turning means responsive to the primary page change counter by which the page of secondary electronic text displayed on said secondary display screen is refreshed by moving the secondary page ahead or back by the number stored in said primary page change counter to reflect the page of primary electronic text chosen to be displayed by the user wherein said user actuated secondary page turning controls allow the user to compare the displayed page of primary text to the page of secondary text displayed after it is so refreshed, and, if deemed necessary by the user, to activate secondary page ahead means or secondary page back means in order to juxtapose the correct secondary page with the primary page in accordance with the translation of the primary text into said second language, and said primary counter is automatically reset to zero.

7. The portable electronic device of claim 6 in which said display screen is a touch screen display.

8. The portable electronic device of claim 6 in which the automatic secondary page turning means further includes a user actuated state control by which the user can override the operation of the automatic secondary page turning means.

9. A method for operating a portable electronic device for reading and studying pre-paginated electronic textual materials resident on the Internet having two display screens juxtaposed in a side by side manner and a primary page change counter that tracks a delta value equal to the number of page changes made when reading or studying said materials comprising:
- providing a database operatively connected to the electronic device having at least two memory portions;
- storing a primary electronic text in a first language in the first of said memory portions, said text having pagination information embedded therein to allow for page by page display;
- storing a secondary electronic text being a translation of said primary electronic text into a second language in the second of said memory portions, said text having pagination information embedded therein to allow for page by page display;
- accessing said primary electronic text and displaying the first page of said primary electronic text on one of said display screens, being referred to herein as the primary display screen;
- accessing said secondary electronic text and displaying the first page of said secondary electronic text on the other of said display screens, being referred to herein as the secondary display screen;
- allowing the user to choose the page of the primary electronic text to be displayed on the primary display screen;
- increasing the primary page change counter automatically by one count for each primary page moved ahead by the user or decreasing said primary counter automatically by one count for each primary page moved back by said user;
- automatically changing the page of the secondary electronic text displayed on the secondary display screen by moving the secondary pages ahead or back by the number of pages equal to the number stored in the primary page change counter to reflect the page of primary electronic text then chosen by the user to be displayed on the primary display screen;
- allowing the user to compare the displayed primary text to the page of the secondary electronic text displayed after such automatic changing, and, if deemed necessary by the user, allowing the user to activate secondary page ahead means or secondary page back means in order to juxtapose the correct secondary page with the primary page in accordance with the translation of the primary translation into said second language,
- and automatically resetting said primary counter to zero;
- whereby the pages of primary electronic text and secondary electronic text are juxtaposed properly in the discretion of the user.

10. The method of claim 9 comprising an additional step of allowing the user to override the automatic changing of the page of the secondary electronic text displayed.

11. The method of claim 9 comprising an additional step of allowing the primary electronic text displayed to be automatically changed to reflect user actuated changes in the secondary electronic text displayed.

* * * * *